United States Patent
Haberle (10) Patent No.: US 9,723,819 B2
(45) Date of Patent: Aug. 8, 2017

(54) BIRD FEEDER WITH ELECTRIC CONDUCTIVE SURFACES FOR REPELLING SQUIRRELS

(71) Applicant: Gene Bossle Haberle, Greensboro, NC (US)

(72) Inventor: Gene Bossle Haberle, Greensboro, NC (US)

( * ) Notice: Subject to any disclaimer, the term of this patent is extended or adjusted under 35 U.S.C. 154(b) by 0 days.

(21) Appl. No.: 15/283,409

(22) Filed: Oct. 2, 2016

(65) Prior Publication Data
US 2017/0094949 A1  Apr. 6, 2017

Related U.S. Application Data

(60) Provisional application No. 62/238,021, filed on Oct. 6, 2015.

(51) Int. Cl.
| | | |
|---|---|---|
| *A01K 39/01* | (2006.01) | |
| *H02S 20/23* | (2014.01) | |
| *H02S 40/38* | (2014.01) | |
| *A01K 39/012* | (2006.01) | |

(52) U.S. Cl.
CPC ........ *A01K 39/0113* (2013.01); *A01K 39/012* (2013.01); *H02S 20/23* (2014.12); *H02S 40/38* (2014.12)

(58) Field of Classification Search
CPC   A01K 39/0113; A01K 39/012; A01K 39/014; A01K 39/00; A01K 15/029; A01M 29/24
USPC ............ 119/52.4, 52.2, 52.3, 57.8, 57.9, 452
See application file for complete search history.

(56) References Cited

U.S. PATENT DOCUMENTS

| | | | | | |
|---|---|---|---|---|---|
| 5,150,665 | A * | 9/1992 | Boaz | .................. | A01K 39/0113 |
| | | | | | 119/52.3 |
| 5,392,732 | A * | 2/1995 | Fry | ..................... | A01K 39/0113 |
| | | | | | 119/52.3 |
| 5,471,951 | A * | 12/1995 | Collins | .............. | A01K 39/0113 |
| | | | | | 119/52.3 |
| 5,894,814 | A * | 4/1999 | Roslonski | .......... | A01K 39/0113 |
| | | | | | 119/52.3 |
| 5,937,788 | A * | 8/1999 | Boyd | ................. | A01K 39/0113 |
| | | | | | 119/52.3 |
| 6,276,298 | B1 * | 8/2001 | Welsh | ................ | A01K 39/0113 |
| | | | | | 119/52.3 |
| 6,619,229 | B1 * | 9/2003 | Lush | .................... | A01K 15/025 |
| | | | | | 119/52.3 |
| 6,830,009 | B1 * | 12/2004 | Kuelbs | ................. | A01K 39/014 |
| | | | | | 119/52.2 |
| 6,951,188 | B1 * | 10/2005 | Lush | .................. | A01K 39/0113 |
| | | | | | 119/52.3 |
| 7,017,521 | B2 * | 3/2006 | Kuelbs | .................. | A01K 39/00 |
| | | | | | 119/452 |

(Continued)

*Primary Examiner* — Yvonne Abbott-Lewis
(74) *Attorney, Agent, or Firm* — Robert W. Pitts (57) ABSTRACT

A bird feeder includes an electric circuitry for delivering a mild shock to squirrels attempting to eat seeds on a seed tray. A seed storage tube dispenses seeds on the surrounding seed tray, which is surrounded by walls forming a shell with windows providing access to the seeds. Window frames form electrodes having a first polarity and both a roof and porches beneath the windows form electrodes of a second polarity. Squirrels will complete the circuit between electrodes, while birds will be unaffected. A solar cell on the roof recharges a battery.

19 Claims, 10 Drawing Sheets

(56) References Cited

U.S. PATENT DOCUMENTS

| | | | |
|---|---|---|---|
| 7,540,262 B2* | 6/2009 | Kuelbs | A01K 39/00 119/452 |
| 9,078,422 B1* | 7/2015 | Alford | A01M 29/24 |
| 2008/0276875 A1* | 11/2008 | Zigan | A01K 39/0113 119/57.9 |
| 2013/0174789 A1* | 7/2013 | Koski | A01K 39/0113 119/57.9 |
| 2014/0318473 A1* | 10/2014 | Cole | A01K 39/0113 119/712 |
| 2015/0173329 A1* | 6/2015 | Barr | A01K 39/0113 119/52.3 |

* cited by examiner

BIRD FEEDER WITH ELECTRIC CONDUCTIVE SURFACES FOR REPELLING SQUIRRELS

CROSS REFERENCE TO PRIOR CO-PENDING APPLICATION

This application claims the benefit of prior co-pending U.S. Provisional Patent Application 62/238,021 filed Oct. 6, 2016.

BACKGROUND OF THE INVENTION

Field of the Invention

This invention is related to a feeder for birds that includes a solar cell charging a battery for deterring intrusive animals, such as squirrels when they try to eat seeds dispensed by the bird feeder.

Description of the Prior Art

U.S. Pat. No. 6,276,298 discloses a solar powered squirrel proof bird feeder that delivers a mild shock to a squirrel without delivering a shock to birds using the feeder. Two side by side copper tubes surrounding a seed tray each provide a perch for the birds. A squirrel, attempting to use the feeder would, however, come into contact with both tubes. A potential difference between the two tubes would be discharged when the squirrel completes a circuit. A solar cell and a battery are employed to charge a capacitor, which will be discharged when the circuit is completed. A roof on the feeder is also connected to the capacitor so that a mild shock will be delivered to a squirrel in contact with one of the tubes and the roof. Even if a bird were to come into contact with electrically conductive surfaces at different potentials, the relatively low moisture content of a bird will prevent the circuit from being completed, thus preventing the birds from being shocked. Seeds are stored in a compartment formed by rectangular walls of this feeder. The roof is hinged so that the seeds may be added, but this prior art feeder does not lend itself to be easily cleaned, especially when the seeds are wet. Visibility of birds feeding on all sides of this feeder is also limited.

Feeders, with transparent feeder tubes are also commonly used. These tube feeders provide multiple vertically spaced perches and feeding stations for birds. An example of such a tube feeder that is supposed to deter squirrels is found in US Patent Application Publication 2013/0174789.

The instant invention combines the use of a seed storage tube with a surrounding shell, which provides access to seeds on a seed tray, but also makes it difficult for squirrels to gain access without encountering a mild electrical shock. Birds can easily feed without completing an electrical circuit and receiving a shock. Birds feeding on all sides are also visible to interested observers.

SUMMARY OF THE INVENTION

A bird feeder in accordance with one aspect of this invention includes a seed storage compartment or tube and a seed tray. Seeds being dispensed on the seed tray from the seed storage compartment by the action of gravity. A shell surrounds the seed tray and is spaced from the seed storage compartment. Windows on multiple sides of the outer shell are positioned to allow access to seeds disposed on the seed tray only through the windows. First and second electric contacts are disposed on the shell in a position to both be engaged by a squirrel attempting to gain access to seeds on the seed tray through the windows to complete a circuit. The circuit includes a source of electrical energy to deliver an electrical shock to the squirrel simultaneously engaging a pair of first and second electrical contacts.

According to another aspect of this invention the bird feeder has a seed storage compartment extending above a seed tray and seeds are dispensed onto the seed tray by the action of gravity. A shell surrounds the seed tray and is spaced from the seed storage compartment. Windows on multiple sides of the shell are positioned to allow access to seeds disposed on the seed tray only through the windows. Electrically conductive members or window frames formed on the windows will be engaged by an animal attempting to gain access to seeds disposed on the seed tray through any one of the windows. One or more electrically conductive surfaces, such as porches below the windows or a roof panel above the windows on the exterior the shell are adjacent to but spaced from the electrically conductive members on the windows. A source of electrical energy, such as a battery is electrically connected to each electrically conductive member on each window and with each electrically conductive surface spaced from the electrically conductive members or window frames. The source of electrical energy delivers an electrical shock to an animal in contact both with one electrically conductive member and one electrically conductive surface but not to an animal only in contact with one electrically conductive member formed on a window, so that birds can access the seeds on the seed tray without encountering an electrical shock.

According to still another aspect of this invention the bird feeder has a seed storage compartment extending above a seed tray. A shell surrounds the seed tray and is spaced from the seed storage compartment. Windows on the shell are positioned to allow access to seeds disposed on the seed tray only through the windows. First and second opposite electrodes are disposed on the shell, but spaced apart, in a position to both be engaged by a squirrel attempting to gain access to seeds on the seed tray. A sensor circuit detects a change in an electric field occurring when a squirrel engages both the first and second opposite electrodes. A stimulation circuit delivers an electric pulse to the squirrel after the sensor circuit detects the change in the electric field occurring when the squirrel engages the first and second opposite electrodes.

DETAILED DESCRIPTION OF THE PREFERRED EMBODIMENT

Figure 1:
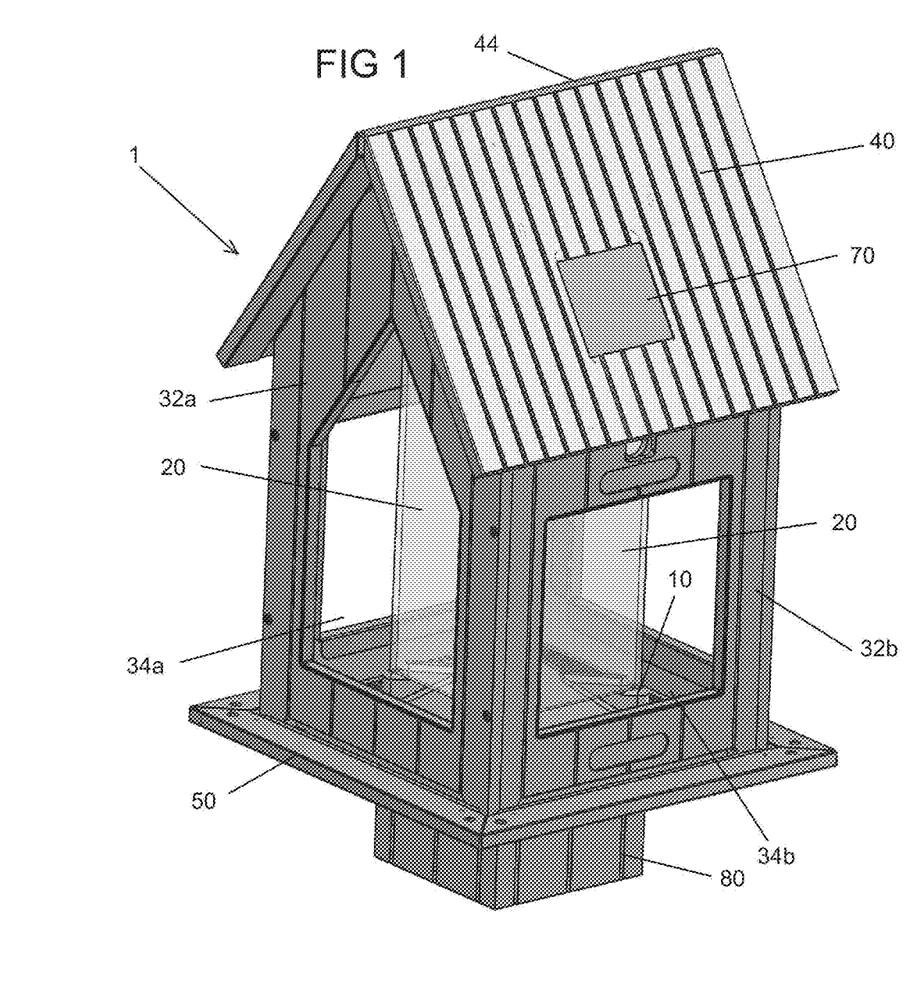
FIG. 1 is a three dimensional view of the bird feeder according to this invention.
Figure 2:
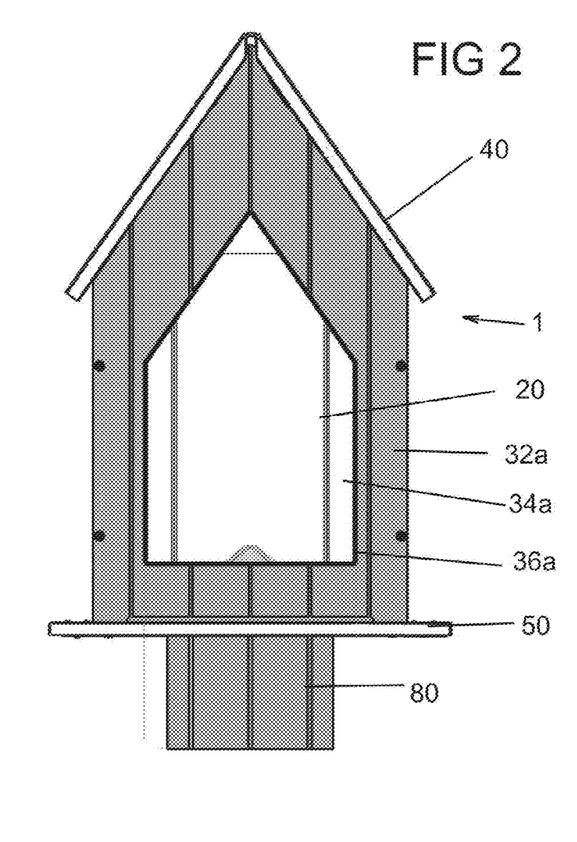
FIG. 2 is a front elevational view of the bird feeder of FIG. 1.
Figure 3:
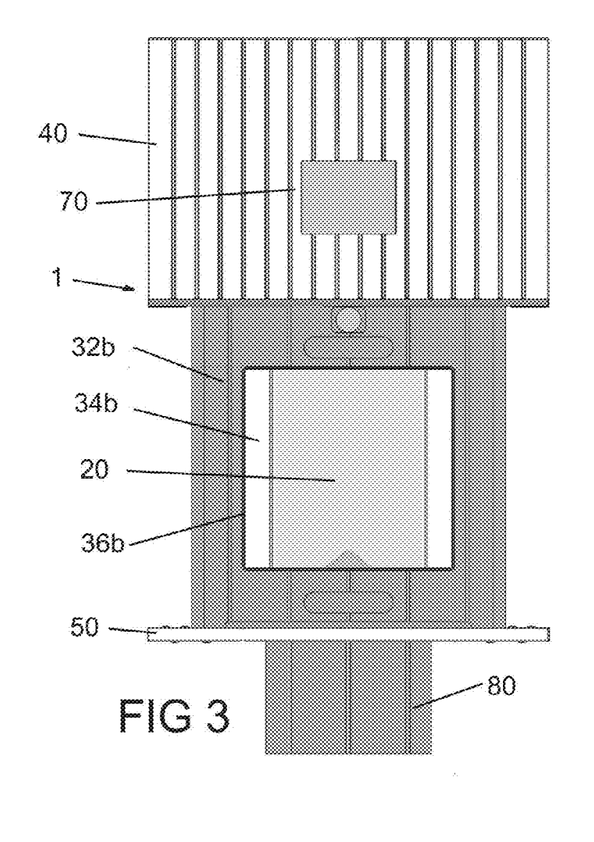
FIG. 3 is a side elevational view of the bird feeder of FIGS. 1 and 2.

The bird feeder 1 of the preferred embodiment of this invention provides a view of wild birds feeding at the bird feeder from all directions, but can repel intruders, such as squirrels, that might otherwise consume seeds that are intended for wild birds. The bird feeder 1 has a seed tray 10 that is accessible on each of its four sides. A seed storage compartment or tube 20 is centrally located relative to the seed tray 10, and is removably mounted on the seed tray 10. Seeds are gravity feed from the seed storage tube 20 onto all sides of the seed tray 10. The seed tray 10 is surrounded by an outer shell 30 having four walls 32*a*-32*d*. Both the seed storage compartment or tube 20 and the seed tray 10 are visible through windows 34*a*-34*d* extending respectively through the four walls 32*a*-32*d*. The tube 10 is clear and seeds and seed level in the tube 10 is visible through the windows 34*a*-34*d*. A porch or ledge 50 extends outwardly from each shell wall 32*a*-32*d* below corresponding windows 32*a*-34*d*. Birds can perch on any of the porches 50 and feed on seeds dispensed on the seed tray 10. A pitched roof 40 sits atop the shell 30 and covers the seed tray 10 in its operative position. However, one side of the roof 40 is hinged at the roof apex 44 to permit access to the seed tray 10 and the seed storage tube 20 so that the tube 10 can be removed and/or refilled and the seed tray 10 and seed tube 20 can be cleaned.

The shell walls 32*a*-32*d* and the roof 40 give the appearance of a traditional bird feeder or a small out building. The shell 30 and roof 40 are not just for decoration, and they provide the barrier against intrusive animals or species, such as squirrels. Electrodes forming an electrical circuit are positioned on the shell 30 and roof 40 where an intruding animal, especially a squirrel, will complete a circuit so that a mild or irritating electrical shock can be delivered to the intruding animal or squirrel without causing any injury. However, a bird can rest on one or more of these electrode members or surfaces without completing an electrical circuit so that the bird will be impervious to any electrical shock. A first set of electrically conductive members or contacts 36 are formed around the interior surfaces of the windows 34*a*-34*d* and form window frame contacts 36. Electrical contacts 36 comprise electrically conductive sheet metal components, which can be fabricated using copper or a copper alloy, that form a trim or window frame around the windows 34*a*-34*d*. All of the contacts 36 are connected to the same polarity on a source of electrical energy, such as a rechargeable battery 62.

There are two different electrically conductive surfaces that are connected to the opposite polarity of the battery 62. The first of these electrically conductive surfaces are formed by a conductive material, such as copper or a copper alloy, and are disposed on each of the porches 50, which are close to, but spaced from the widow frame contacts 36 of opposite polarity. A squirrel attempting to reach seeds on the seed tray 10, while resting on one of the porches 50, will inevitably come into contact with one of the window frame contacts 36 of opposite polarity. A circuit is then completed so that the squirrel will receive a non-injurious electrical shock or stimulation. Both sides of the pitched roof 50 also have electrically conductive sheet metal panels 46 that is connected to terminals of the battery 62 having the same polarity as the terminals to which the conductive surfaces forming the porch 50 are connected. The roof panels 46 can be fabricated from copper or a copper alloy. The porches 50 and the roof panels 46 are spaced from each other, but any intruding squirrel would need to come into contact with either the conductive surfaces comprising the porches 50 or one of the roof panels 46 to gain access to seeds on the seed tray 10. However, the intruding squirrel will eventually engage one of the window frame contacts 36 and will receive an unwelcome electrical surprise. The walls 32*a*-32*b* are formed or an insulating material and are hydrophobic preventing the accumulation of moisture which might short circuit the window frames 36*a*-36*d* and the conductive roof panels 46 or porches 50.

Figure 4:
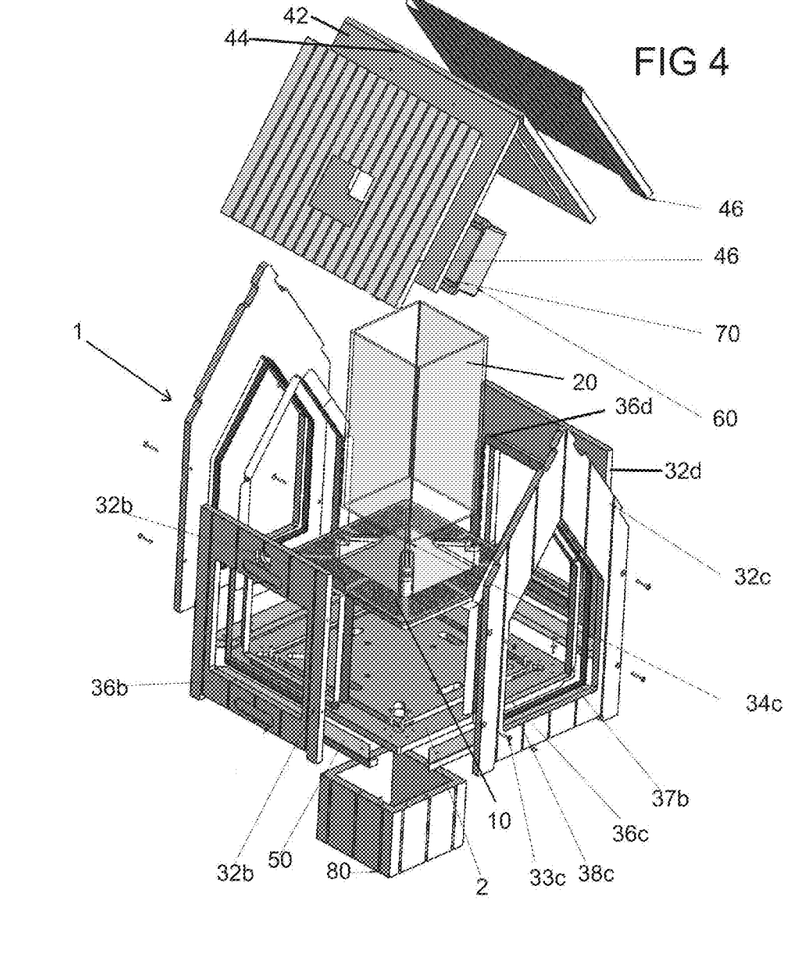
FIG. 4 is an exploded view of the bird feeder of FIGS. 1-3.

The exploded view of FIG. 1 demonstrates how the bird feeder 1 is assembled. The floor 2 supports the other components. The seed tray 10 is centrally located on the floor 2, and the seed tube 20 is supported by the seed tray 10. The four walls 32*a*-32*d*, which form the shell 30, are supported adjacent the periphery of the floor 2 and can be held together by fasteners, such as fastener 33*c*. The porches 50 are located along each of the four side edges of the floor 2, and the conductive sheet metal forming the porch electrodes are fitted around the edges of the floor 2 beyond the walls 32*a*-32*d* and extend beneath the lower edges of the walls 32*a*-32*d* as shown by bottom edge 33*c*.

Two of the walls 32*b* and 32*d* are rectangular, while the other two walls 32*a* and 32*c* have five edges, the upper two forming a peak so that the pitched roof 40 can be supported. The roof 40 is formed by two nonconductive roof members 42, with electrically conductive sheet metal panels 46 mounted on the roof members 42 to provide electrically conductive surfaces. One of the two roof base members is hinged relative to the other at the roof apex 44. When the hinged roof base member 42 is raised, an opening sufficient for insertion and removal of the seed tube 20 is formed. The other roof section is fixed to the shell walls 32*a*, 32*b* and 32*c*. An opening 48 extends though this fixed roof base 42 and through the corresponding electrically conductive surface formed by the panel 46. A solar cell 79 is mounted in this opening and an electronics module 60 is mounted on the interior of the fixed base section adjacent the solar cell 70.

Sheet metal window frames 36*a*-36*b* are mounted on the inner periphery of the windows 34*a*-34*b* and secured on the interior of the walls 32*a*-32*d*. Since the window frame contacts 36*a*-36*b* extend all around the windows 34*a*-34*b*, any animal attempting to gain access to seeds on the seed tray 10 will eventually come into contact with one of the window frame contacts 36*a*-36*d*.

The bird feeder 1 includes a support member 80 attached to the bottom of the floor 2 so that the bird feeder 1 can be mounted on a post or other support member.

Figure 5:
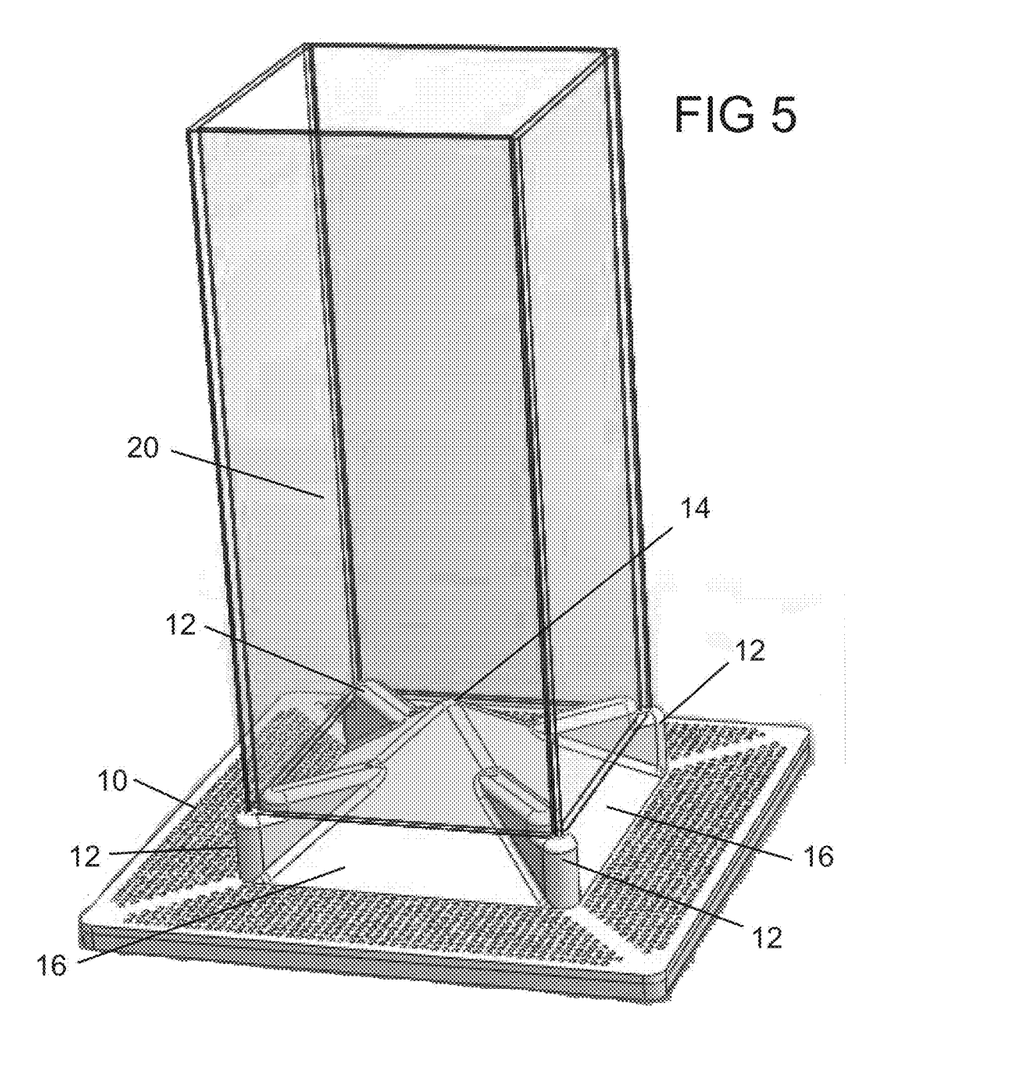
FIG. 5 is a view showing the seed storage compartment as it would be mounted on the seed tray of the embodiment of FIGS. 1-4.
Figure 6:
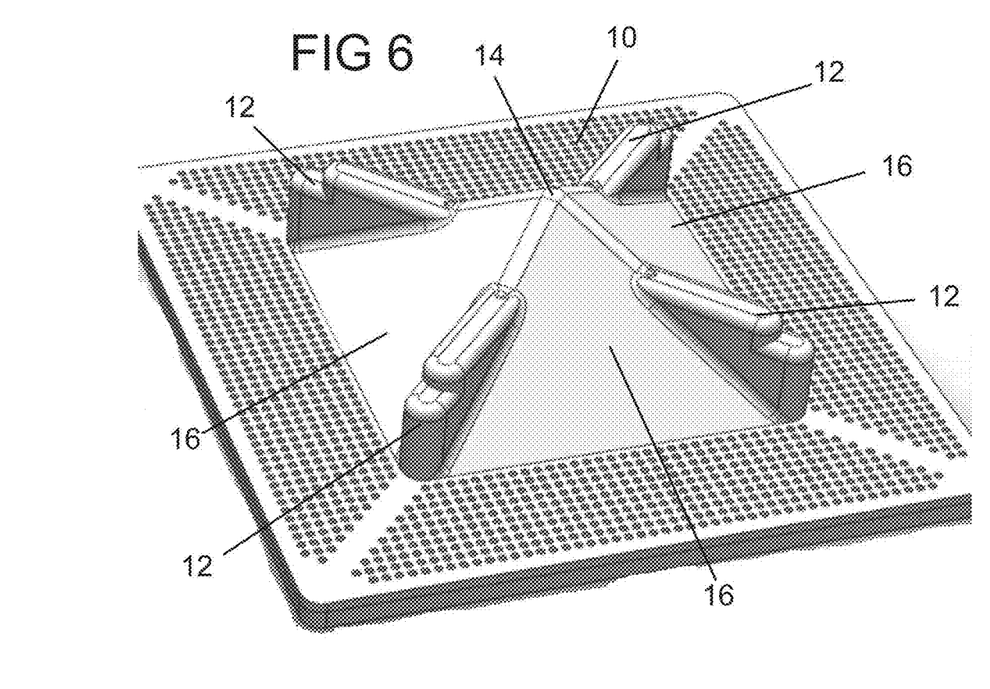
FIG. 6 is a view of the seed tray of the embodiment of FIGS. 1-5.

FIGS. 5 and 6 show details of the seed tray 10 and seed storage tube 20. As seen in FIG. 5, the tube 20 sits on four tube supports 12 extending upwardly from the seed tray 10. These tube supports 12 are located to support each corner of a rectangular open ended tube 20. A tube having a circular cross section could also be employed. The tube supports 12 hold the tube 20 in a position so that a gap is formed between the bottom edge of the tube 20 and the upper surface of the seed tray 10. This allows seed stored in the seed storage tube 20 to be fed by gravity onto the portion of the seed tray 10 extending laterally beyond the tube 20, where the seed will be accessible to birds using the feeder 1. The seed tray 20 has four sloping surfaces 16 extending away from an apex 14 so that the seeds in the storage tube 20, mounted above the sloping surfaces 16, will travel outwardly though the gap maintained by the tube supports 12 onto the accessible portions of the seed tray 10.

The seed storage tube 20 is not attached to the seed tray 10 or the tube supports 12 and merely rests on the supports, which do however keep the tube 20 from sliding laterally.

The seed storage tube 20 can therefore be removed from the seed tray 10 when one side of the hinged roof 40 is opened. The seed tray 20 can also be removed in the same manner. This allows both the tube 20 and the seed tray 10 to be periodically cleaned. Cleaning is necessary to remove debris and to remove seeds that have become contaminated, especially due to exposure to moisture. Otherwise the seed tube 20 could become clogged.

Although this bird feeder 1 can be employed as a passive device, it also is equipped with a deterrent that can be used to ward off intrusive species, such as squirrels, who are attracted to the seeds and can drive off the birds for whom the seed is primarily intended. An electrical circuit is provided to deliver a mild, but irritating, electrical shock to unwanted squirrels. This electrical circuit can be deactivated if desired. The circuit employed with bird feeder 1 includes an intrusion sensor to detect the presence of an intrusive species, but which will not be triggered by wild birds using the bird feeder 1. The electrical circuit also includes a stimulator for generating a mild electrical shock. The shock is approximately as strong as a static electrical discharge that a person can easily generate, especially on dry winter days. A solar cell 70 is employed to charge a storage battery used in the stimulus generator. A switch is employed to turn the stimulator on or off as desired, and an LED can be incorporated to determine when the stimulator is activated. When switched Off to On, the LED blinks once per second for five blinks as a warning before enabling the stimulus generator. Thereafter, the charge rate is monitored by a micro-controller so that use can tell when enough light is available. The LED will blink slowly in darkness, but will speed up during charging. If the LED blinks even slightly faster when the solar cell is illuminated compared to when in darkness, the user will know that the storage battery cells are being charged. When fully charged, the feeder will operate for weeks, even in total darkness. Even one hour of sunlight will power the feeder for days, and a total of about ten hours will be sufficient for fully charging the battery.

In the preferred embodiment, the power supply or source of electrical energy can comprise two permanent AA NIMH cells forming the storage battery 62. These rechargeable batteries are charged by a roof-mounted solar cell 70 that will be exposed to direct sunlight, but which can also recharge the battery 62 when in bright shade. The solar cell 70 will recharge the battery 62 whether the stimulator is in either the On or Off position.

The intrusion sensor detect the intrusion of squirrels by conductivity and capacitance changes between the window frames 34a-34d and the roof panels 46 or the porches 50 completing the sensing circuit. A micro-controller monitors these changes, comparing the signal to a stored reference value. When the stored reference value of conductivity or capacitance is exceeded, the stimulus generator is triggered.

Figure 7:
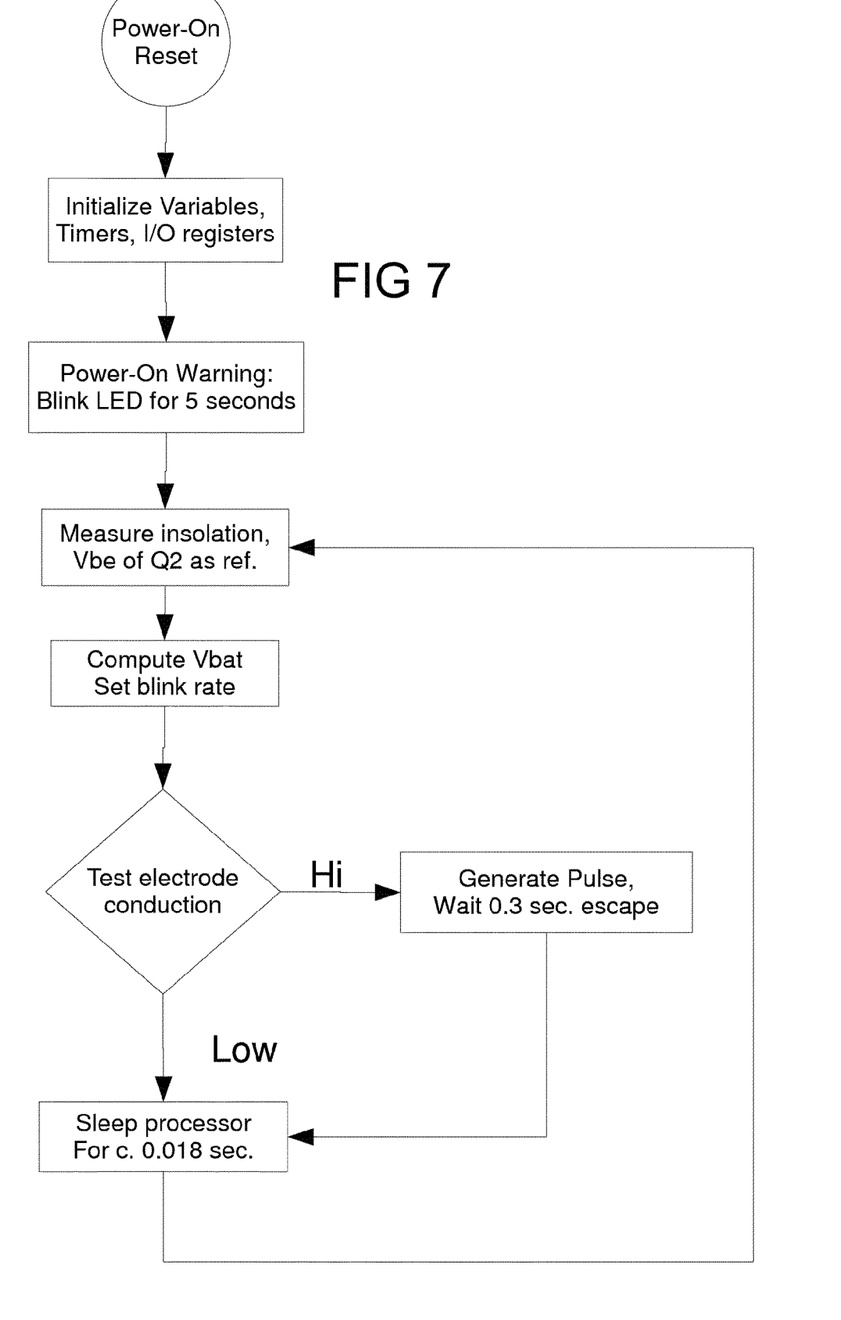
FIG. 7 is a flow charge showing the operation of the stimulus circuit used in the preferred embodiment of this invention.

The stimulus generator employs the same micro-controller. When triggered, the micro-controller turns on a transistor that connects a low voltage winding of a small transformer to a 2.4 Volt pair of cells. In about 0.018 seconds, the current through this winding ramps from zero to 2 Amperes. At this time, the micro-controller turns off the transistor, forming a voltage spike across a high voltage winding. Snubbing resistors on both windings help to limit the maximum output voltage to about 1200 Volts, and the transformer is designed to limit the current peak of the pulse to 0.2 Amperes. A second pulse is generated after 0.018 sec. followed by a pause of 0.3 seconds to allow the intruder to escape. The operative steps are shown in the flow chart of FIG. 7.

Figure 8:
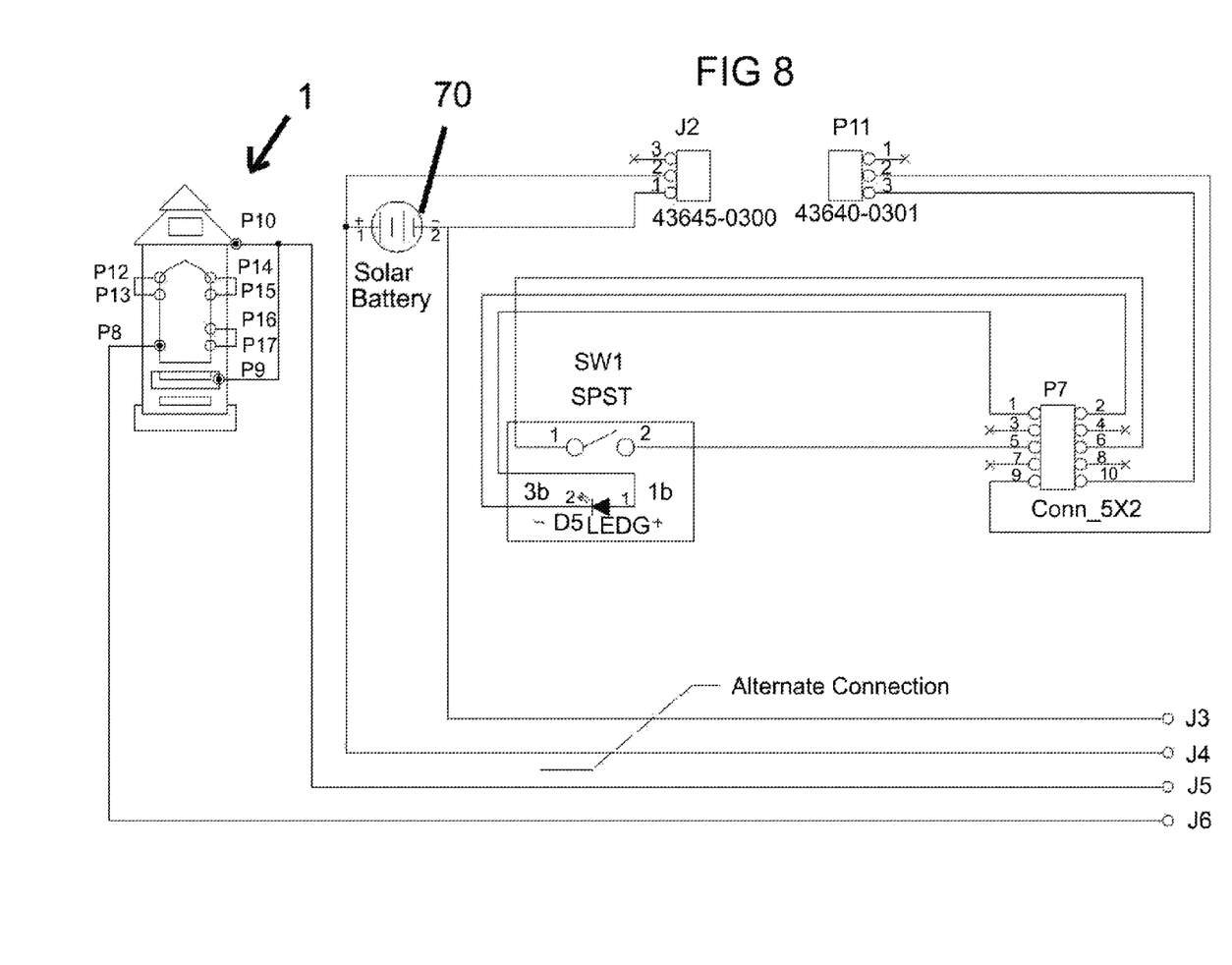
FIG. 8 is a wiring diagram for the bird feeder.
Figure 9A:
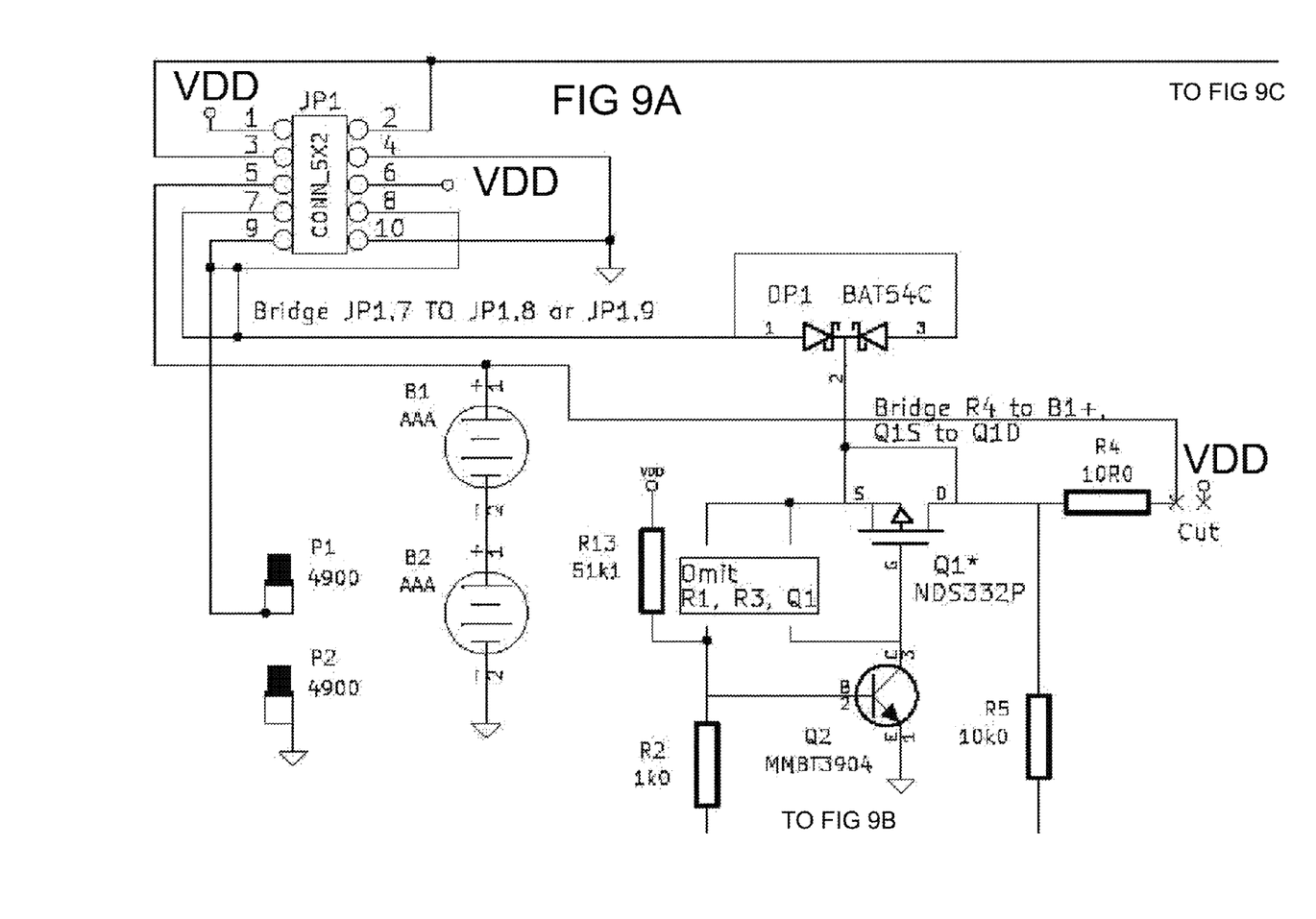
FIGS. 9A-9C, which are continuations of each other, as noted, shows the circuit employing a micro-controller for controlling both the sensor and the stimulus generator.
Figure 9B:
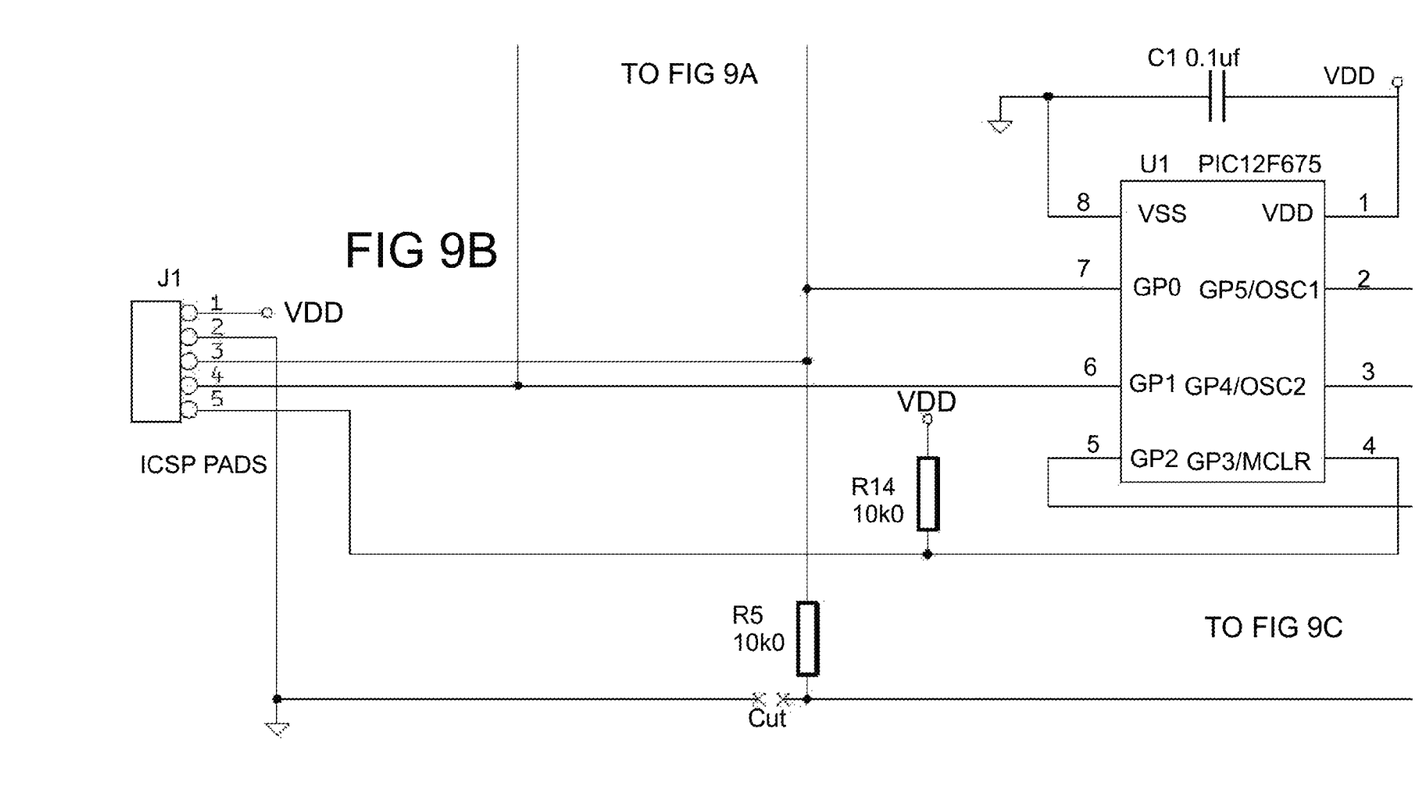

FIG. 8 is a wiring diagram for both the intrusion sensor and the stimulus generator. Connector J5 is connects both the conductive porch 50 (at P9) and the roof panels 46 (at P10) to the circuit shown in FIG. 9. Connector J6 attaches to one of the window frames or window trim 36a-36d (at P8) and the all four window frames 36a-36d are connected by jumpers as shown at P12-P17. The solar cell 70 (at SB1) is roof mounted and is connected to the circuit shown in FIG. 9 by connectors J2 and P11. Connector P11 connects two wires to the circuit board containing the circuit of FIGS. 9A-9C through socket P7, which mates with circuit board header J1 in FIG. 9B. An alternate connection of the solar cell 70 is possible by J3 and J4, which can be implemented for test and inspection purposes. These connectors mate with circuit board connectors P2 and P2 shown in FIG. 9A. The On-Off switch is a single pole single throw switch SW1.

Figure 9C:
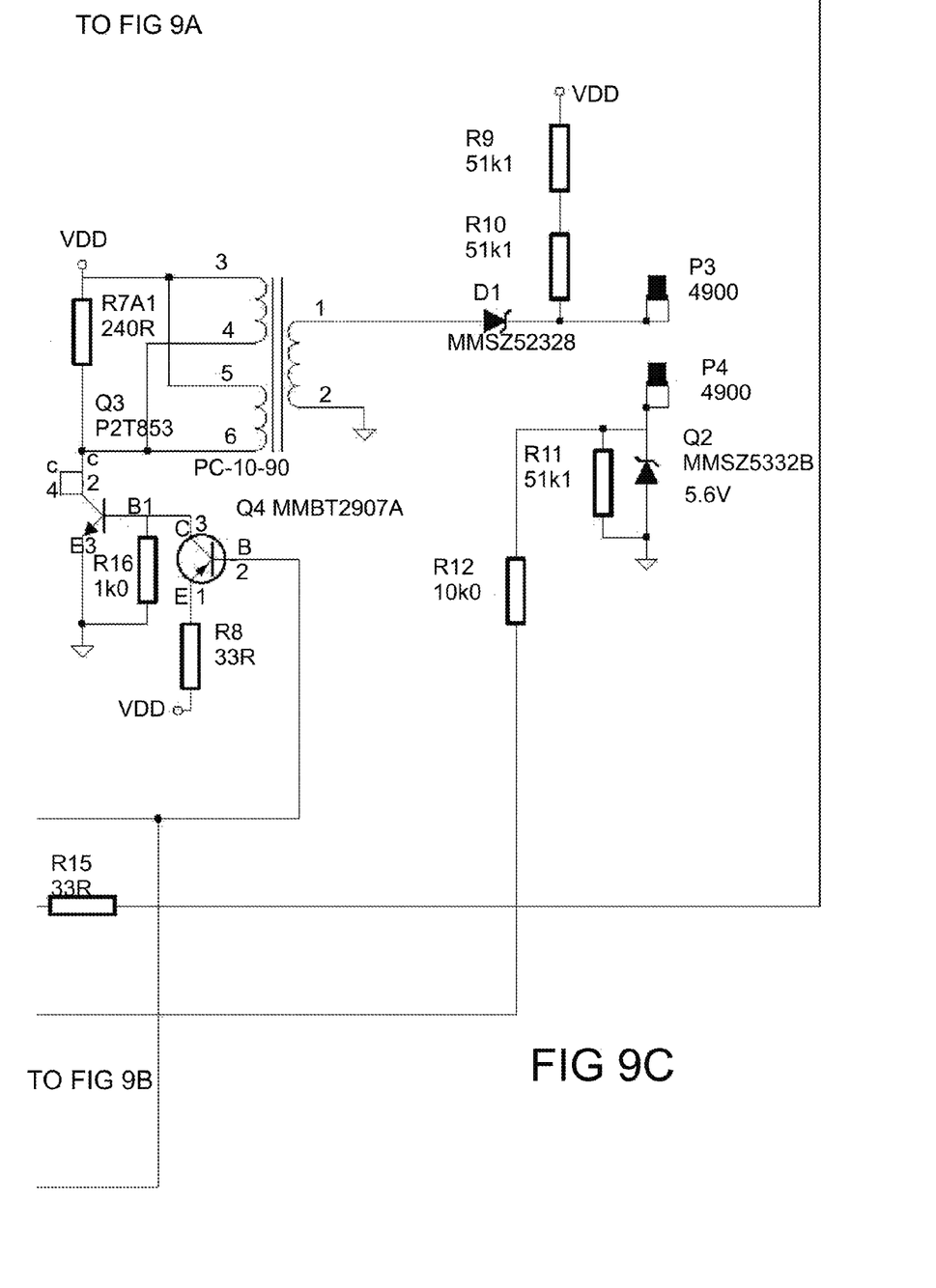

In FIG. 9C, the sensing and stimulating electrodes are connected to terminals P3 and P4. The micro-controller U1 senses conductivity as a voltage developed across resistor R11 and Zener diode D2 by small currents passing through any object or animal bridging the electrodes 38a-36d and/or 46 and 50 and on the bird feeder 1. This current is impressed by either the application of battery voltage of about 2.4 Volts through resistors R9 and R10, or the output of transform L1. When the transformer is excited by turning on transistor Q4, a short (about 60 microsecond) pulse of about 40 Bots is applied to the electrodes.

When a stimulus is generated, Q4 is turned on long enough (about 18 milliseconds) to bring the core of L1 near or into saturation. When Q4 is turned off, a voltage spike of 1200 Volts is generated.

Since photo-voltaic cells lead large currents in the dark, Schottky diode DPI isolates the battery in this condition. The rechargeable battery is comprised of Nickel-metal hybrid cells B1 and B2.

The charge current is sensed by R4 and scaled by half by divider R5 and R6.

R7A1 is a snubbing resistor that controls the maximum voltage of L when lightly loaded by high resistance across the electrodes.

J1 is the circuit board pad pattern for programming and test purposes.

Q2 serves as a voltage reference by being biased by battery current through R13.

There are two factors that prevent an electrical discharge from being delivered to a bird using the bird feeder 1. First birds of the type using this feeder 1 would not be small enough to bridge the gap between electrodes or electrical contacts of opposite polarity. Typically the birds could perch on the electrically conductive window frames 36a-36d, but would not come into contact with either the roof panels 46 or the porch 50 which form electrodes of opposite polarity. The birds would not be large enough bridge this gap. A second factor involves the physiology of the birds themselves. The moisture content of birds' feet is so low there would be little if any electricity passed through the bird's feet, which would essentially be insulators, that would not complete even a leakage circuit of sufficient magnitude. The same is not true of intrusive species, especially squirrels. A squirrel is large enough that it would eventually short a circuit, or cause a change in capacitance, by simultaneously coming into contact with the first contacts or electrodes formed by the window frames 36a-36d and the second contacts or electrodes formed by either the roof panels 46 or one of the porches 50.

The bird feeder depicted herein comprises the currently preferred embodiment of this invention, however it should be only considered to be representative of other versions which would not depart form the invention claimed and defined by the following claims, but which would be apparent to one of ordinary skill in the art following the embodiment as described herein.

I claim:

1. A bird feeder comprising:
a seed storage compartment extending above a seed tray, seeds being dispensed on the seed tray by the action of gravity;
a shell surrounding the seed tray and spaced from the seed storage compartment;
windows on multiple sides of the shell positioned to allow access to seeds disposed on the seed tray only through the windows;
electrically conductive members formed on the windows so that an animal attempting to gain access to seeds disposed on the seed tray through any one of the windows could contact the electrically conductive member on that window;
at least one electrically conductive surface on the exterior the shell and adjacent to but spaced from the electrically conductive members on the windows; and
a source of electrical energy electrically communicating with each electrically conductive member on each window and with each electrically conductive surface spaced from the electrically conductive members, the source of electrical energy delivering an electrical shock to an animal in contact both with one electrically conductive member and one electrically conductive surface but not to an animal only in contact with one electrically conductive member formed on a window so that birds can access the seeds on the seed tray without encountering an electrical shock.

2. The bird feeder of claim 1 wherein the electrically conductive members and the electrically conductive surfaces are positioned relative to each other to render it difficult for a squirrel to access the seeds on the seed tray without simultaneously contacting both one electrically conductive member formed on a window and an electrically conductive surface.

3. The bird feeder of claim 1 wherein the electrically conductive surface comprises a roof extending over the shell.

4. The bird feeder of claim 3 wherein the seed storage compartment is removable from the shell by redeployment of the roof so that the seed tray can be cleaned.

5. The bird feeder of claim 1 wherein the electrically conductive surface comprises a surface extending around the shell and comprising a porch.

6. The bird feeder of claim 1 wherein the shell comprises four walls joined at corners with windows extending through each of the four walls.

7. The bird feeder of claim 6 wherein the four walls are formed of a hydrophobic material to prevent water from accumulating on the walls so short an electric circuit between an electrically conductive member on a window and an electrically conductive surface.

8. The bird feeder of claim 1 wherein an electric circuit detects a change in capacitance when an animal simultaneously comes into contact with both between an electrically conductive member on a window and an electrically conductive surface and an electric pulse is then delivered by the source of electrical energy.

9. The bird feed of claim 1 wherein a solar cell mounted on the bird feeder recharges a battery comprising the source of electrical energy.

10. The bird feeder of claim 1 wherein the seed storage compartment comprises a tube mountable above the seed tray.

11. A bird feeder comprising:
a seed storage compartment extending above a seed tray, seeds being dispensed on the seed tray by the action of gravity;
a shell surrounding the seed tray and spaced from the seed storage compartment;
windows on multiple sides of the outer shell positioned to allow access to seeds disposed on the seed tray only through the windows; and
at least first and second electric contacts disposed on the shell in a position to both be engaged by a squirrel attempting to gain access to seeds on the seed tray through the windows to complete a circuit including a source of electrical energy to deliver an electrical shock to the squirrel simultaneously engaging a pair of first and second electrical contacts, wherein a first electrical contact is located on an edge of each window.

12. The bird feeder of claim 11 wherein a second electrical contact is located adjacent to, but spaced from, each window.

13. The bird feeder of claim 11 including a sensor for detecting completion of an electrical circuit when a squirrel simultaneously engages both a first and second electrical contact, the sensor communicating with the source of electrical energy to initiate an electrical shock to the squirrel simultaneously engaging both a first and second electrical contact.

14. The bird feeder of claim 13 wherein the sensor detects a change in capacitance between a first and a second contact, when the squirrel simultaneously engages both a first electrical contact and a second electrical contact.

15. A bird feeder comprising:
a seed storage compartment extending above a seed tray;
a shell surrounding the seed tray and spaced from the seed storage compartment;
windows on the shell positioned to allow access to seeds disposed on the seed tray only through the windows; and
at least first and second opposite electrodes disposed on the shell in a position to both be engaged by a squirrel attempting to gain access to seeds on the seed tray:
a sensor circuit for detecting a change in an electric field occurring when a squirrel engages both the first and second opposite electrodes; and
a stimulation circuit for delivering an electric pulse to the squirrel after the sensor circuit detects the change in the electric field occurring when the squirrel engages both the first and second opposite electrodes.

16. The bird feeder of claim 15 wherein both the sensor circuit and the stimulation circuit are responsive to the same control member.

17. The bird feeder of claim 15 wherein the control member comprises a micro-controller.

18. The bird feeder of claim 15 wherein successive pulses are delivered to the squirrel only after a time delay sufficient to permit the squirrel to disconnect from one of the first and second electrodes.

19. The bird feeder of claim 15 wherein the first and second electrodes are disposed on the bird feeder so that a squirrel resting on the bird feeder must eventually come into simultaneous contact with bot the first and second electrodes.

* * * * *